United States Patent [19]
Hamilton

[11] Patent Number: 5,894,815
[45] Date of Patent: Apr. 20, 1999

[54] BOREDOM-REDUCING FEEDING DEVICE FOR CAGED ANIMALS

[76] Inventor: Peter Hamilton, Box 3117, Vancouver, BC, Canada, V6B 3X6

[21] Appl. No.: 08/877,420

[22] Filed: Jun. 17, 1997

[51] Int. Cl.⁶ .................................................. A01K 5/00
[52] U.S. Cl. .................................... 119/61; 119/477
[58] Field of Search ........................... 119/61, 52.1, 475, 119/477

[56] References Cited

U.S. PATENT DOCUMENTS

| | | |
|---|---|---|
| 574,312 | 12/1896 | Emery .................... 119/52.1 |
| 1,297,586 | 3/1919 | Nordmann ................. 119/61 |
| 1,522,084 | 1/1925 | Swearingen ............. 119/52.1 X |
| 3,251,342 | 5/1966 | Kay . |
| 3,645,234 | 2/1972 | Schroer .................... 119/477 |
| 4,046,108 | 9/1977 | Balgemann et al. ......... 119/475 X |

OTHER PUBLICATIONS

"Anti–boredom Devices for Primates" p. 16 of Comfortable Quarters for Laboratory Animals, 2d Ed., 1979, pub. by Animal Welfare Institute, Washington DC.

*Primary Examiner*—Robert P. Swiatek
*Attorney, Agent, or Firm*—David Pressman

[57] ABSTRACT

An animal feeding device or food environment is a behavioral device and eating trough which mimics the natural foraging and eating behavior of non-human primates, such as macaques and baboons, in order to reduce the boredom, stress, and suffering of these captive primates. The device is attached with three specially designed fasteners to the front or side of a primate cage for easy access and for the safety of both personnel and the animals. The device comprises an elongated main tube (10) having a longitudinal side opening (12) and ends (14) with eyelets (22) attached to the cage bars (24) by turnbuckle clamps (26). A bristle brush (16) is mounted on the inside of the main tube on the bottom. Food particles are placed at the bottom of the bristles so that the animal can forage in such bristles. Several scoop tubes (18) are mounted at one end of the brush. Each scoop tube (18B) is elongated and vertical with an open top with a removable cap (18C), and a horizontally oriented projecting side extension tube (18D). Each extension tube has an open end (18A) accessible via the main tube's longitudinal opening. The main tube (10) also has a horizontal dip tube (20) extending from its longitudinal opening. The dip tube has a dipstick (20B) (an elongated rod with a piston (20C) at its distal end) positioned in the main tube so that the animal can pull out a pastelike food placed below the piston.

19 Claims, 3 Drawing Sheets

BOREDOM-REDUCING FEEDING DEVICE FOR CAGED ANIMALS

BACKGROUND

1. Field of Invention

This invention relates generally to animal feeding devices, particularly to a device for treating caged animals in a more humane manner by enriching their feeding procedure.

2. Description of Prior Art

Researchers commonly keep many non-human animals (hereafter "animals") in cages and use them for various experiments. When such animals are used as surrogates for humans in experiments, they are called "animal models". Animal rights organizations are working to eliminate the use of animal models since animals not only suffer from such experiments, but suffer from merely keeping them caged. Some of these organizations also believe that the use of animal models is scientifically fallacious because animals (a) do not have the same problems and lifestyles as humans, (b) react differently to various stimuli, methodologies, and tests, and (c) provide test results which cannot be validly extrapolated to humans. However thus far these organizations have not yet been able to raise the consciousness of the general public about this practice sufficiently to elicit a broadly based outcry. Also, ecology organizations are concerned about protecting animal rights and stopping the waste of scarce health care funds. In the meantime, laboratory animals continue to be subjected to physical and psychological suffering.

For example, U.S. Pat. No. 3,251,342 to Kay (1966) shows an animal feed cage with a door having a bottle with a feeding tube projecting from the bottle's bottom into the cage. A container also is mounted on the door below the bottle. The container has a fill trough on its outside wall and an opening facing into the cage (FIG. 4) so that the caged animal can reach into the container and get the food. The purpose of Kay's device is to enable a keeper to feed caged animals more easily and to prevent them from disrupting the feeding devices attached to their cage. Although this device feeds solids and liquids to the animals while they are kept in Kay's cage, they are subject to boredom since the cage is small and confining and there is basically nothing for them to do but to drink and eat in a very simple manner.

Schroer, in U.S. Pat. No. 3,645,234 (1972), shows a feeder similar to the bottle portion of Kay's feeder. Schroer's feeding tube has a bottom which extends into the cage and a top which has a pointed end for piercing cans. Again, the caged animals are subject to boredom since the cage is small and confining and the only activity for them is to drink and eat in a simple manner.

To alleviate the boredom and other inhumane aspects of these and other conventional cage and feeder arrangements, Dr. Jane Goodall, a well-known primate researcher, has developed a device, termed a "grape board", for feeding primates. The device comprises a box with J-shaped tubes and is described in "Comfortable Quarters for Laboratory Animals", published. by Animal Welfare Institute, Washington, D.C., 1979. A keeper supplies food (e.g., grapes or any other suitable comestible) at the top of the long arm of the J-shaped tube and the animal reaches into the top of the short arm to retrieve the food. The purpose of this device is to force the caged primate to exert some effort to retrieve the food from the bottom of the "J" and thereby relieve some boredom. While somewhat effective, this device provides relatively little challenge and thus only partially satisfies the animal's psychological needs.

OBJECTS AND ADVANTAGES

Accordingly several objects and advantages of the invention are to decrease the amount of suffering by animals in general and to decrease the amount of cruelty and psychological suffering by caged animals. Other objects and advantages are to provide an improved feeding system for caged animals, to provide such a feeder which challenges the animal, fulfills some of their behavioral and psychological needs, and is easy to install and remove from a cage.

Additional objects and advantages will become apparent from a consideration from the ensuing description and drawings.

DRAWING FIGURES

Figure 1:
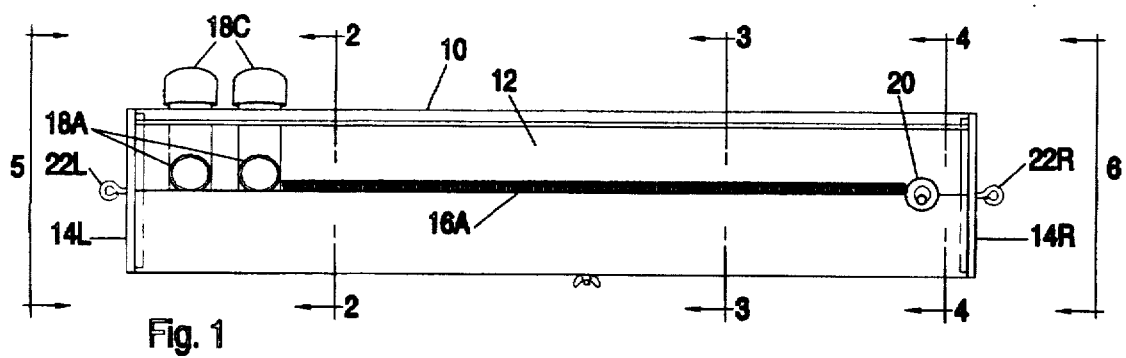
FIG. 1 is a side view of a feeding device (feeder) for caged animals in accordance with the invention.

DRAWING REFERENCE NUMERALS 10 feeder tube
12 slot
14 (L & R) end
14C corner
16 brush
16A bristles
16B base
16C stud and thumbscrew
18 scoop tube
18A openings
18B vertical tube
18C cap
18D horizontal tube
20 dip tube
20A cap
20B stick
20C piston
20D knob
20F flange
20T tube
22S threads
22 (L & R) eyelets
24 cage
26 turnbuckle

SUMMARY

In accordance with the invention, an animal feeding device or feeding system comprises an elongated main tube having a longitudinal opening. The ends of the tube have eyelets which are attached to the bars of the cage by respective adjustable turnbuckle clamps. The bottom on the inside of the tube supports an elongated brush. Pieces of food are placed at the bottom of the bristles so that the animal can forage in the brush for the pieces of food and thus causes it to emulate its the animal's feeding behavior in the wild. The main tube also has a plurality of scoop tubes mounted therein at one end of the brush. Each scoop tube comprises an elongated vertically oriented tube with a closed bottom, a capped open top, and a horizontally oriented side extension tube projecting from and communicating with the side of the vertical tube intermediate its top and bottom. The horizontal tube has an open end accessible from the longitudinal opening of the main tube for enabling the animal to remove food. A horizontally oriented dip tube is positioned in and extends from the longitudinal opening of the main tube. The dip tube comprises a plain tube with a dipstick (an elongated rod with a piston at its distal end) positioned in the plain tube so that the animal can pull out and remove soft food, such as peanut butter, which sticks to the piston.

DESCRIPTION

Feeder Tube

FIG. 1

Figure 7:
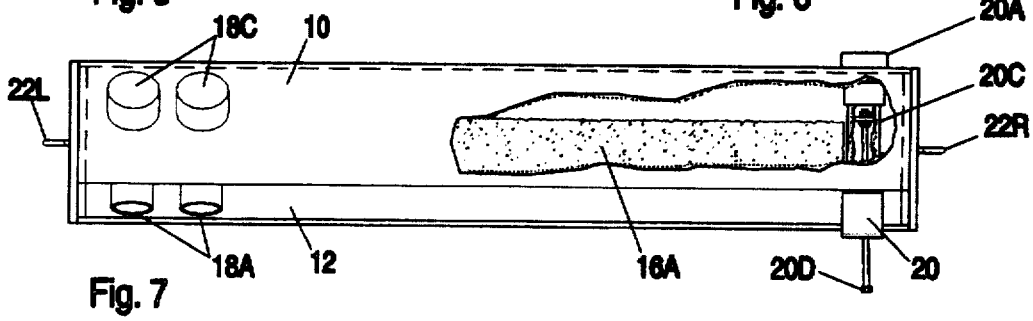
FIG. 7 is a top view of the feeder of FIG. 1.

A side view of a cage-mountable feeder or main tube 10 according to the invention is shown in FIG. 1 and a top view is shown in FIG. 7. The tube is a circular cylinder made of metal or rigid plastic and is about 72 cm long and 16 cm in diameter. It has closed ends 14L (left) and 14R (right). End 14R is held on by screw threads (not shown), friction, a bayonet-type attachment (not shown), or glue. A longitudinal slot or opening 12 about 70 cm wide extends the full length of the tube, except for the ends. Tube 10 includes three different feeding devices or implements: a brush 16, a pair of scoop tubes 18 at the left end of brush 16, and a dip tube 20 at the right end of brush 16. As indicated, the scoop tubes have openings 18A accessible through slot 12. Brush 16 has bristles 16A visible in slot 12. Dip tube 20 projects from slot 12 and extends through the bars of the cage, which is shown in FIG. 8.

Figure 6:
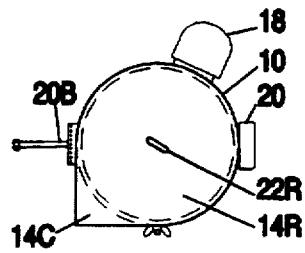
FIG. 6 is a right end view of the feeder taken in the direction indicated by lines 6—6 of FIG. 1.
Figure 8:
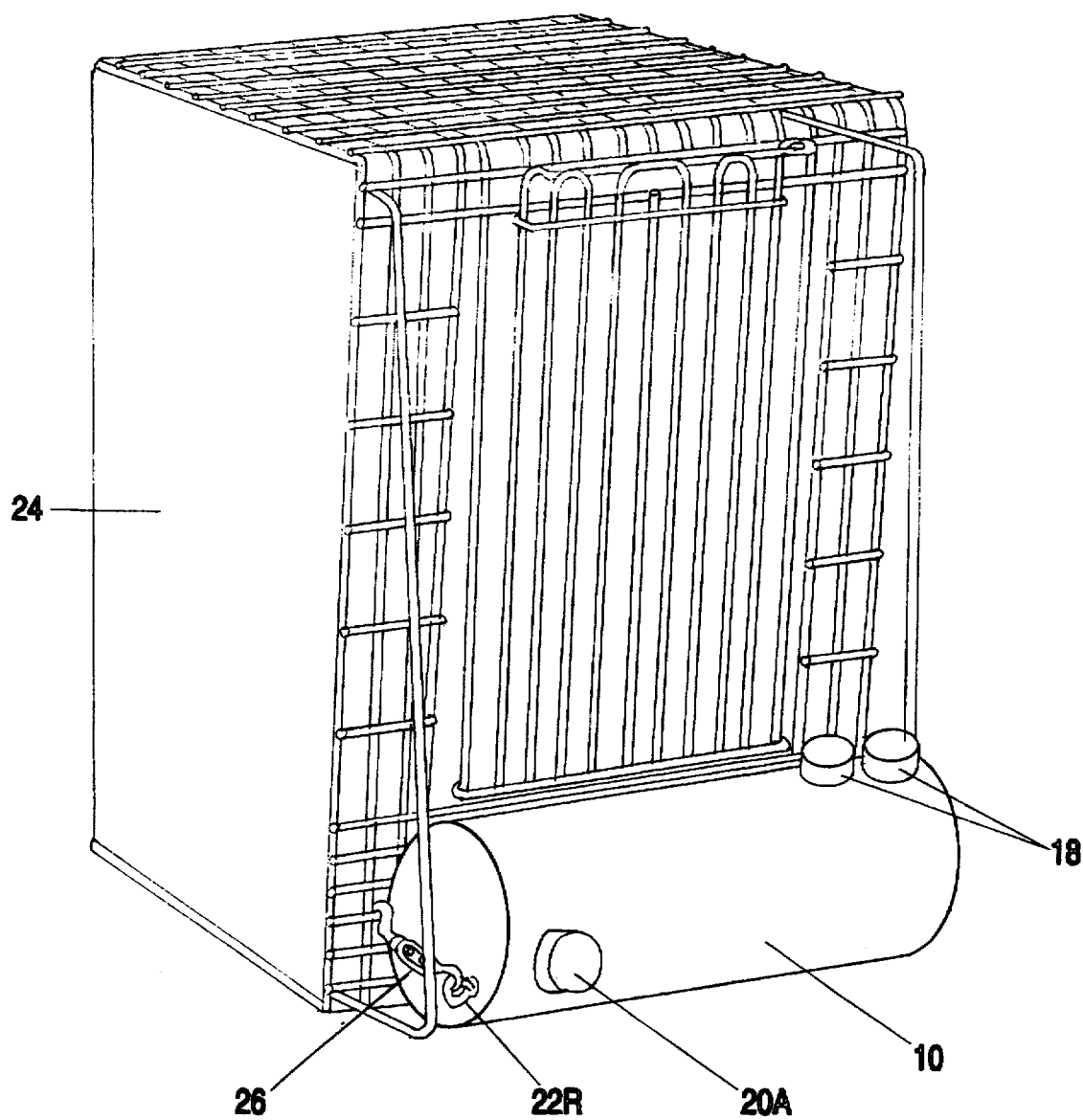
FIG. 8 is a perspective view of the feeder installed on an animal cage.

A pair of eyelets 22L and 22R, each about 14 mm in internal diameter, are attached to and project from ends 14L and 14R, respectively, in the locations indicated (FIGS. 1, 8, and 6). Since end 14L is fixed, eyelet 22L will always have the same orientation. To insure that eyelet 22R on end 14R is always in the same position, end 14R is also fixed. Alternatively if end 14R is removable and replaceable, the body of the tube may include an orientation control (not shown) to enable the user to always attach end 14R so that eyelet 22R is in the correct orientation. Such an orientation control may be a keying slot in tube 10 and mating key rib on end 14R in the case of a friction-fit end, or a pair of mating guide lines in the case of a screw-on end.

Scoop Tubes

FIG. 2

Figure 2:
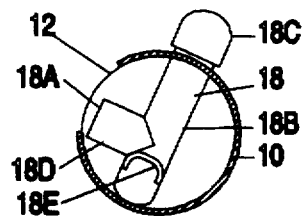
FIG. 2 is a sectional view of the feeder taken in the direction indicated by lines 2—2 of FIG. 1.

FIG. 2 shows a sectional view taken in the direction indicated by lines 2—2 of FIG. 1. (Brush 16 is not shown in order to illustrate scoop tube 18—which is behind brush 16—more clearly.) Each scoop tube 18 comprises a main, generally vertically oriented tube 18B about 18 cm long with a friction-held or screw-on cap 18C on its upper end and with an integrally closed bottom end. Integrally molded to vertical tube 18B is a generally horizontally oriented tube 18D which extends out about 2.25 cm from the outside of tube 18B. Tube 18D has open end 18A, above described, and tubes 18B and 18D are both about 5 cm in diameter. The center axis of tube 18D is about 7.5 cm up from the bottom of tube 18B. The upper end of each of each scoop tube extends through a respective hole (not shown) in the upper surface of feeder tube 10 and openings 18A at then ends of horizontal tubes 18D face outwardly at slot 12, but are spaced inwardly therefrom about 1.5 cm (FIGS. 7 and 2).

Scoop tubes 18 are installed in tube 10 by inserting them into position through slot 12 and then screwing their bottoms to the bottom of tube 10. The head of each screw (not shown) is on the outside of the bottom of tube 10. The animal will not be injured by the point of the screw (which extends into scoop tube 18) because a smaller cap or barrier 18e is positioned within each scoop tube.

Brush

FIG. 3

Figure 3:
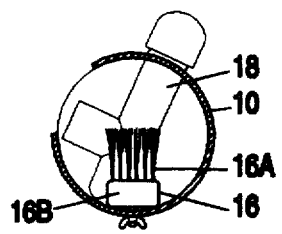
FIG. 3 is a sectional view of the feeder taken in the direction indicated by lines 3—3 of FIG. 1.

FIG. 3 shows a sectional view taken in the direction indicated by lines 3—3 of FIG. 1. Brush 16 is shown in section with scoop tube 18 therebehind. Brush 16 has a base 16B of plastic about 45.5 cm by 7 cm by 3 cm thick. Its bristles 16A are about 5.5 cm long so as to extend above the bottom edge of slot 12, as shown in FIG. 1. The bristles are arranged in tufts whose centers are about 1.5 cm apart so that there will be spaces therebetween for pieces of food, as described infra. Each tuft may have about 20 to 50 individual bristles. Brush 16 is attached to tube 10 by a threaded stud 16C which extends through a hole (not shown) in the bottom of tube 10 and which is held by a wingnut (also designated 16C) underneath tube 10. Brush 16 can thus easily be removed for cleaning. The tops of bristles 16A are shown in the cutaway area of FIG. 7.

Dip Tube

Figure 4A:
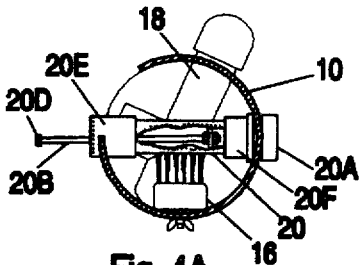
FIG. 4A is a sectional view of the feeder taken in the direction indicated by lines 4—4 of FIG. 1
Figure 4B:
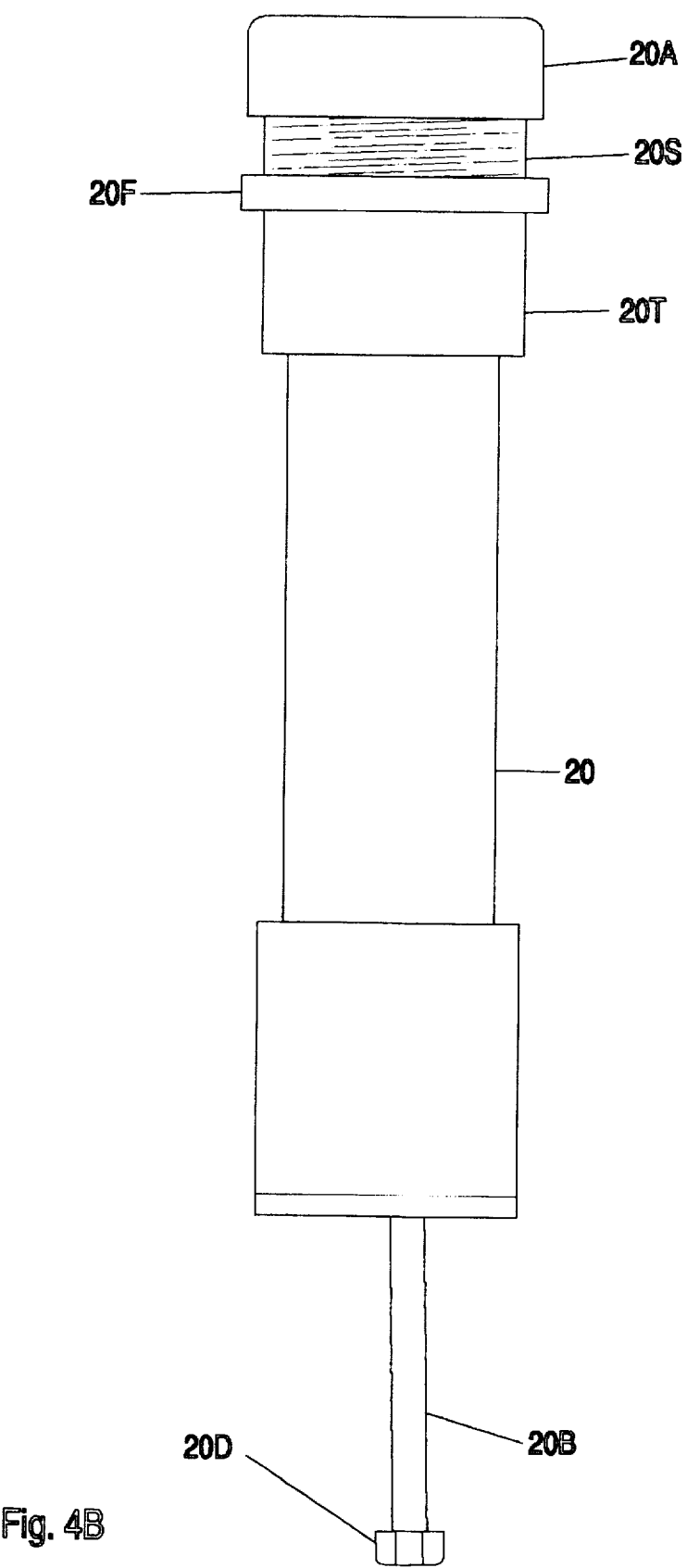
FIG. 4B is a side view of a dip tube shown in FIG. 4A.

FIGS. 4A and 4B

FIG. 4 shows a sectional view taken in the direction indicated by lines 4—4 of FIG. 1. Dip tube 20 is shown in full view with a partially cutaway portion in FIG. 4A and in full view and in more detail in FIG. 4B, scoop tube 18 therebehind. Brush 20 also therebehind and thereunder. Dip tube 20 is about 19 cm long, about 3.75 cm in inside diameter, an preferably is made of metal, such as stainless steel. It has an end cap 20A which is held on by screw threads 20S (FIG. 4B) or friction fit. A dipstick 20B is slidably mounted in tube 20. See also the view of the dipstick through the cutaway portion in FIG. 7. Dipstick 20B is an elongated rod or stick with a piston 20C at its end distal from the cage and animal and a knob 20D at its proximal end. Piston 20C may be a washer having a diameter slightly less than the inside diameter of tube 20; it is held onto the dipstick by the nuts shown on its respective sides. Dipstick 20B is normally positioned in tube 20 with piston 20C at its distal (righthand) end in FIG. 4A and stick 20B projecting out only slightly from tube 20. However the stick is shown pulled out a significant distance in FIG. 4A. The stick can be removed for cleaning by removing screw cap 20A and sliding it out. To prevent it from being pulled out of the left end (FIG. 4A), the left end of tube 20 has inwardly ears or a flange (not shown) which project inwardly about 0.5 cm. As shown in FIG. 4B, the dip tube has a flange 20F which extends out about 0.75 cm from a barrel portion 20B which is also threaded onto the end of tube 20. The flange is not shown in FIG. 4A for clarity.) Flange 20F and cap 20A cooperate to lock the dip tube onto feeder tube 10.

Figure 5:
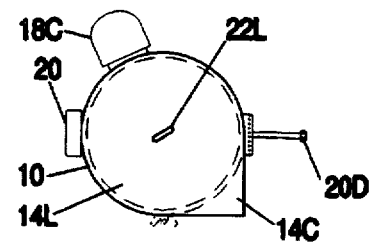
FIG. 5 is an left end view of the feeder taken in the direction indicated by lines 5—5 of FIG. 1.

Left And Right End Views
FIGS. 5 And 6

FIGS. 5 and 6 show left and right end views, respectively, of the feeder, these view are taken in the directions indicated by lines 5—5 and 6—6, respectively, of FIG. 1. Note that dip tube 20 projects out from slot 12 and the rear of tube 10, scoop tube 18 projects up from the top of the feeder, and eyelet 22L and 22R are attached to closed end 14L and removable end 14R, respectively. Also note that ends 14L and 14R each have a corner portion 14C at their fronts so part of the ends of the feeding device sits flush against the cage. This provides the end with a flat portion which faces in the same direction as the slot so that the feeder will not roll or turn when it is positioned against a cage, as shown in FIG. 8.

Cage-Installed Feeder
FIG. 8

The feeder is installed on a typical animal cage 24 (FIG. 8) which has a front composed of a wire grid or bars with a large feeding slot at its lower portion (not shown, but behind the feeder). The feeding slot should be as large as slot 12 of the feeder and the bars or wires of the cage should have segments on either side of the feeding slot.

A pair of adjustable turnbuckles, one of which is shown at 26, are connected to respective eyelets 22R and 22L. Each turnbuckle consists of an open hook at its distal end; this hook passes through the eyelet on the feeder. At the proximal end, the turnbuckle has a normally closed, but openable hook which hooks around a bar of the cage. Between these two ends, the turnbuckle consists of an adjusting portion which can be turned in well-known fashion to adjust the distance between the two end hooks.

The end of each turnbuckle which is hooked to a bar of the cage by an openable hook has a tightly fitting, slidable sleeve (not shown) which is positioned to lock the hook. This is done to prevent the primate from opening and removing the hook from the bar of the cage.

OPERATION

Loading And Installation

Prior to installing the feeder on the cage, as shown in FIG. 8, the feeder is first "loaded" or filled with food for the animal.

Assuming the feeder and cage are used for a monkey or other small primate, a particulate, pellet, or piecelike food, such as baked, grain-based nuggets, animal feed pellets, grapes, nuts, seeds (e.g., sunflower seeds), etc. is loaded into scoop tubes 18 while they are in the feeder tube. Caps 18C of the scoop tubes are removed and the food is poured into the scoop tubes until its level reaches the top of the scoop tube.

Then brush 16 is loaded using a particulate or small-pellet food. It may be the same food used in the scoop tubes if its pellet size is smaller than the spaces between the bottoms of tufts of bristles 16A. The brush is loaded while it is in the main tube by inserting one's fingers through slot 12, separating the tufts with the fingers, and placing the food between the tufts.

Finally dip tube 20 is loaded, preferably with a solid, pastelike food, such as peanut butter. The feeder or keeper does this by removing cap 20A, the dip tube, pushing dipstick 20B to the top of the tube (right end of FIG. 4A) and filling the tube ⅓ to ½ full, on the left side of piston 20C, with the food, e.g., with a knife, syringe, pastry decoration squeeze bag, etc. Alternatively, the food can be placed on the right side of the piston so that the primate can push it in to force the food past the piston and then pull the rod and piston out to access the food. Initially the dipstick can be coated with the food until the primate learns to pull the rod out to cause the piston to push to food out so that it is within reach. Then the dipstick is installed by pushing it through its hole in tube 10 and screwing on cap 20A to lock it to the feeder tube.

The feeder is now loaded with a variety of food.

To install the feeder on the cage, the turnbuckles are first installed on the feeder as indicated in FIG. 8 so that the ends with the openable hooks hang free. The feeder is brought up to the cage so that slot 12 (FIG. 1) mates with the feeding slot (not shown) on cage 24.

Then, while the feeder is held against the cage, the openable hooks are attached to portions of the cage wire on either side of the feeding slot as indicated. If either turnbuckle is too short to reach the cage, it is suitably lengthened until it is long enough so that its openable hook can just be hooked over a bar of the cage. If it is too long to hold the feeder snugly to the cage, it is suitably shortened.

When both proximal hooks are adjusted in length and installed on the cage as indicated, the feeder will be held snugly to the cage, with its slot 12 adjacent the feeding slot of the cage. Flat portions or corners 14C of ends 14L and 14R formed (FIGS. 5 and 6) will face the cage. I.e., these flat portions will face in the same direction as the slot and will thus be positioned flat against the cage so that the feeder will not roll or turn when it is in position.

The loading and mounting are now complete and the caged animal can now feed from the feeder.

Feeding

After the feeding tube is installed, the animal (not shown) will reach into the scoop tubes to remove the pieces of food with its fingers. Due to the constraint imposed by the narrowness of openings 18A and the rest of the tube, the animal will be able to remove but small quantities or pieces of food at a time. This will lengthen the feeding time and present a challenge to the animal. The animal will be so busy getting the pieces of food that a considerable amount of boredom will be relieved.

Similarly the animal will have to forage in brush 16 (through slot 12) for the food pieces at the bottoms of the tufts. This will also take considerable time and will present a significant challenge to the animal, thus also alleviating boredom.

In like manner, the animal will have to repeatedly pull out dipstick 20B to get to the food in the dipstick. This will also challenge the animal and will provide a way of serving a varied pastelike food to the animal in a gradual manner.

All three feeding devices fulfill the behavior needs of the animal by enabling it to forage, search for food, and exert effort to obtain its food. It therefore relieves the animal of some of the former psychological suffering.

When the animal is finished feeding, the keeper can easily remove the feeder from the cage to clean and reload it.

CONCLUSIONS, RAMIFICATIONS, SCOPE

The reader will thus see that I have provided an animal feeder which will decrease the amount of psychological suffering by animals in general and will decrease the amount of cruelty and boredom suffered by caged animals. The feeder enriches the space and activity of caged animals by providing challenges to the animal and fulfilling some of the behavioral needs, The device is easy to install and remove from a cage.

While the above description contains many specificities, these should not be construed as limitations on the scope of the invention, but as exemplifications of the presently-preferred embodiment thereof. Many other ramifications and variations are possible within the teachings of the invention. For example, the three feeding devices can be changed in position, one or two can be eliminated, piston 20C can have a partially circular shape so that the animal will have to turn it to pull out all of the food from the dip tube, the tufts of bristles of brush 16 can be replaced by flexible plastic small "umbrellas", "trees", or rods, tube 10 can be made transparent, and means other than the turnbuckles can be used to attach the feeder to the cage, such as end brackets with nuts and bolts. The dip tube can be L-shaped (without a bottom portion); in this case it would be mounted in the main tube by a holding bracket (not shown) or other means. The horizontal section of the dip tube can be shorter, or longer so that it projects out from the slot in the main tube.

Thus the scope of the invention should be determined by the appended claims and their legal equivalents, and not by the examples given.

I claim:

1. A feeding device which can be attached to an animal cage for feeding a caged animal in a more complex and natural manner in order to reduce boredom, stress, and suffering of said animal, comprising:

an elongated tube having a wall with a longitudinal slot in said wall, means for mounting said elongated tube onto said cage so that an animal within said cage can reach through said slot to the interior of said elongated tube, a brush positioned within said elongated tube, said brush having a base and a plurality of tufts of bristles extending up from said base, whereby food particles can be placed between and at the bottoms of said tufts so that said animal must forage in said bristles for said food particles, thereby to provide a boredom-relieving challenge for said animal, and a scoop tube mounted in said elongated tube, said scoop tube comprising a relatively long vertical tube and a relatively short horizontal tube, said vertical tube having top and bottom ends, said top end projecting out from an opening in said wall of said elongated tube, said opening being spaced from said longitudinal slot in said elongated tube, said horizontal tube having one end attached to and communicating with said bottom end of said vertical tube, said horizontal tube being oriented generally normal to said vertical tube, the opposite end of said horizontal tube being closer to said slot than said one end of said horizontal tube, whereby an animal in said cage can reach into said horizontal tube and take food from the bottom of said vertical tube, thereby to provide an additional boredom-relieving challenge for said animal.

2. The feeding device of claim 1, further including mounting means for mounting said elongated tube on said animal cage so that said longitudinal slot faces an inside of said cage.

3. The feeding device of claim 2 wherein said mounting means comprises a flat side on one side of said longitudinal tube.

4. The feeding device of claim 2 wherein said mounting means comprises a pair of turnbuckles mounted at opposite ends of said longitudinal tube.

5. The feeding device of claim 2 wherein said mounting means comprises a flat side on one side of said longitudinal tube and a pair of turnbuckles mounted at opposite ends of said longitudinal tube.

6. A feeding device which can be attached to an animal cage for feeding a caged animal in a more complex and natural manner in order to reduce boredom, stress, and suffering of said animal, comprising:

an elongated tube having a wall with a longitudinal slot in said wall, means for mounting said elongated tube onto said cage so that an animal within said cage can reach through said slot to the interior of said elongated tube, a brush positioned within said elongated tube, said brush having a base and a plurality of tufts of bristles extending up from said base, whereby food particles can be placed between and at the bottoms of said tufts so that said animal must forage in said bristles for said food particles, thereby to provide a boredom-relieving challenge for said animal, and a dip tube comprising a tube having a piston therein for pushing food inside said dip tube along the inside of said dip tube, and a dipstick attached to said piston and projecting out of one end of said dip tube, said dip tube being mounted in said elongated tube so that an end of said dipstick and said one end of said dip tube is positioned adjacent said longitudinal slot.

7. The feeding device of claim 6, further including a scoop tube mounted in said elongated tube, said scoop tube comprising a relatively long vertical tube and a relatively short horizontal tube, said vertical tube having top and bottom ends, said top end projecting out from an opening in said wall of said elongated tube, said opening being spaced from said longitudinal slot in said elongated tube, said horizontal tube having one end attached to and communicating with said bottom end of said vertical tube, said horizontal tube being oriented generally normal to said vertical tube, the opposite end of said horizontal tube being closer to said slot than said one end of said horizontal tube, whereby an animal in said cage can reach into said horizontal tube and take food from the bottom of said vertical tube.

8. The feeding device of claim 7, further including mounting means for mounting said elongated tube on an inside of said animal cage so that said longitudinal slot faces said inside of said cage.

9. The feeding device of claim 7 wherein said mounting means comprises a flat side on one side of said longitudinal tube and a pair of turnbuckles mounted at opposite ends of said longitudinal tube.

10. A feeding device which can be attached to an animal cage for feeding a caged animal in a more complex and natural manner in order to reduce boredom, stress, and suffering of said animal, comprising:

an elongated tube having a wall with a longitudinal slot in said wall, means for mounting said elongated tube onto said cage so that an animal within said cage can reach through said slot to the interior of said elongated tube, a scoop tube mounted in said elongated tube, said scoop tube comprising a relatively long vertical tube and a relatively short horizontal tube, said vertical tube having top and bottom ends, said top end projecting out from an opening in said wall of said elongated tube, said opening being spaced from said longitudinal slot in said elongated tube, said horizontal tube having one end attached to and communicating with said bottom end of said vertical tube, said horizontal tube being oriented generally normal to said vertical tube, the opposite end of said horizontal tube being closer to said slot than said one end of said horizontal tube, whereby an animal in said cage can reach into said horizontal tube and take food from the bottom of said vertical tube, thereby to provide a boredom-relieving challenge for said animal.

11. The feeding device of claim 10, further including a brush positioned within said elongated tube, said brush having a base and a plurality of tufts of bristles extending up from said base, whereby food particles can be placed between and at the bottoms of said tufts so that said animal must forage in said bristles for said food particles, thereby to provide an additional boredom-relieving challenge for said animal.

12. The feeding device of claim 10, further including a dip tube comprising a tube having a piston therein for pushing food inside said dip tube along the inside of said dip tube, and a dipstick attached to said piston and projecting out of one end of said dip tube, said dip tube being mounted in said elongated tube so that an end of said dipstick and said one end of said dip tube is positioned adjacent said longitudinal slot.

13. The feeding device of claim 10, further including means for mounting said elongated tube on an animal cage having an inside so that said longitudinal slot faces said inside of said cage.

14. The feeding device of claim 13 wherein said means comprises a flat side on one side of said longitudinal tube.

15. The feeding device of claim 13 wherein said means comprises a pair of turnbuckles mounted at opposite ends of said longitudinal tube.

16. The feeding device of claim 13 wherein said means comprises a flat side on one side of said longitudinal tube and a pair of turnbuckles mounted at opposite ends of said longitudinal tube.

17. The feeding device of claim 10, further including (a) a brush positioned within said elongated tube, said brush having a base and a plurality of tufts of bristles extending up from said base, whereby food particles can be placed between and at the bottoms of said tufts so that said animal must forage in said bristles for said food particles, thereby to provide an additional boredom-relieving challenge for said animal, and (b) a dip tube comprising a tube having a piston therein for pushing food inside said dip tube along the inside of said dip tube, and a dipstick attached to said piston and projecting out of one end of said dip tube, said dip tube being mounted in said elongated tube so that an end of said dipstick and said one end of said dip tube is positioned adjacent said longitudinal slot.

18. The feeding device of claim 10, further including (a) a brush positioned within said elongated tube, said brush having a base and a plurality of tufts of bristles extending up from said base, whereby food particles can be placed between and at the bottoms of said tufts so that said animal must forage in said bristles for said food particles, thereby to provide an additional boredom-relieving challenge for said animal, and (b) means for mounting said elongated tube on an animal cage having an inside so that said longitudinal slot faces said inside of said cage.

19. The feeding device of claim 18 wherein said means comprises a flat side on one side of said longitudinal tube and a pair of turnbuckles mounted at opposite ends of said longitudinal tube.

* * * * *